United States Patent
Holbrook et al.

(10) Patent No.: US 10,538,020 B2
(45) Date of Patent: Jan. 21, 2020

(54) METHOD OF MOLDING A LINED PLASTIC STORAGE TANK

(71) Applicant: Infiltrator Water Technologies, LLC, Old Saybrook, CT (US)

(72) Inventors: Paul R Holbrook, Old Saybrook, CT (US); Roy E Moore, Jr., Killingworth, CT (US); Bryan A Coppes, Old Saybrook, CT (US)

(73) Assignee: INFILTRATOR WATER TECHNOLOGIES LLC, Old Saybrook, CT (US)

( * ) Notice: Subject to any disclaimer, the term of this patent is extended or adjusted under 35 U.S.C. 154(b) by 350 days.

(21) Appl. No.: 15/256,517

(22) Filed: Sep. 3, 2016

(65) Prior Publication Data

US 2017/0001349 A1    Jan. 5, 2017

Related U.S. Application Data

(63) Continuation-in-part of application No. 14/444,831, filed on Jul. 28, 2014, now Pat. No. 9,889,986.

(51) Int. Cl.
*B29C 44/02* (2006.01)
*B29C 45/16* (2006.01)
*B29K 23/00* (2006.01)
*B29L 9/00* (2006.01)
*B29L 31/00* (2006.01)

(52) U.S. Cl.
CPC ...... *B29C 45/1671* (2013.01); *B29K 2023/04* (2013.01); *B29K 2023/10* (2013.01); *B29L 2009/00* (2013.01); *B29L 2031/7126* (2013.01)

(58) Field of Classification Search
CPC .......... B29C 45/1671; B29C 45/14008; B29C 2045/1404; B29C 2045/14057; B65D 88/08; B65D 88/52; B65D 90/046; B65D 90/06; B29D 22/003; B29K 2023/04;
(Continued)

(56) References Cited

U.S. PATENT DOCUMENTS

| | | | |
|---|---|---|---|
| 4,546,900 A | 10/1985 | Lackey | |
| 5,005,726 A * | 4/1991 | Robbins | B29O 49/54 220/495.05 |

(Continued)

FOREIGN PATENT DOCUMENTS

| | | | |
|---|---|---|---|
| WO | WO 1984/001352 | 4/1984 | |
| WO | WO8401352 | * 4/1984 | B29C 45/14 |

OTHER PUBLICATIONS

ISA/US search report for International Application PCT/US15/42533, dated Jan. 12, 2016, 14 pages.

*Primary Examiner* — Andrew T Kirsch
*Assistant Examiner* — Elizabeth J Volz
(74) *Attorney, Agent, or Firm* — C. Nessler

(57) ABSTRACT

A method of making a plastic tank suitable for containing water comprises forming a tank base which is partially or fully lined with a plastic layer that is different in character or color from the plastic material of the substrate of the tank base. The tank is alternatively formed by injection molding substrate material around the core of a mold which is partially or fully covered by the liner material, and by injecting liner material into the mold to bond it to the tank base substrate in conjunction with retracting part or all of the core, to provide space in the mold for the liner material.

16 Claims, 9 Drawing Sheets

(58) Field of Classification Search
CPC .......... B29K 2023/10; B29K 2101/12; B29K 2105/26; B29L 2009/00; B29L 2031/7126
USPC ................................. 220/682; 249/63, 175
See application file for complete search history.

(56) References Cited

U.S. PATENT DOCUMENTS

| | | |
|---|---|---|
| 5,456,586 A | 10/1995 | Carson |
| 5,501,012 A | 3/1996 | Nogles |
| 6,626,320 B2 | 9/2003 | Berg, Sr. |
| 7,810,670 B2 | 10/2010 | Carter et al. |
| 9,016,498 B2 | 4/2015 | Barber et al. |
| 2003/0094393 A1 | 5/2003 | Sahm, III |
| 2004/0256763 A1* | 12/2004 | Collette .............. B29C 45/1625 264/255 |
| 2009/0038984 A1 | 2/2009 | Hosoi |

\* cited by examiner

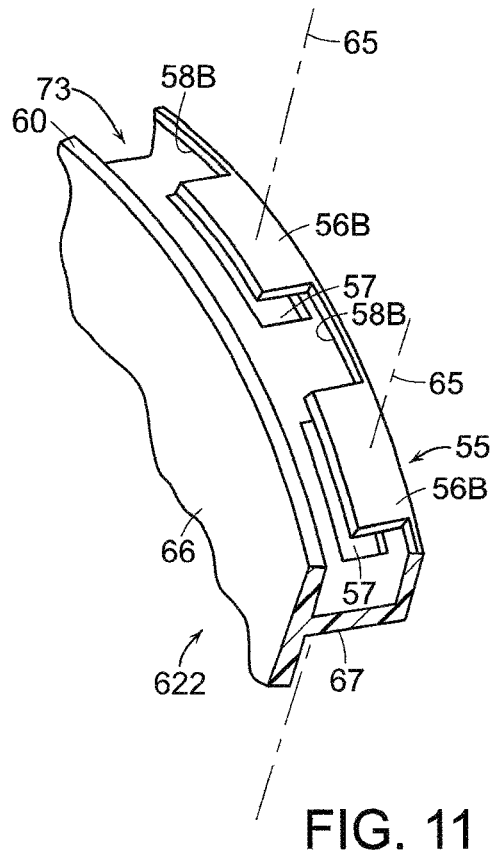
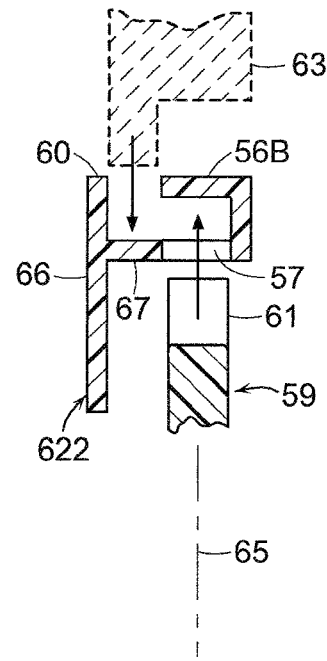
FIG. 11
FIG. 11A
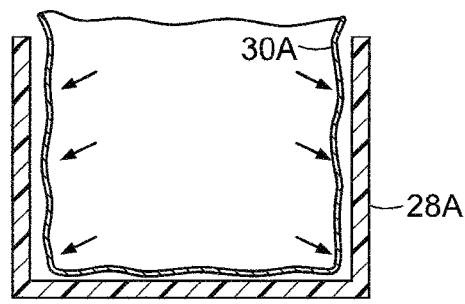
FIG. 12

US 10,538,020 B2

METHOD OF MOLDING A LINED PLASTIC STORAGE TANK

This application is a continuation in part of application Ser. No. 14/444,831, filed Jul. 28, 2014, which application claims benefit of provisional patent application Ser. No. 61/858,757, filed Jul. 26, 2013.

TECHNICAL FIELD

The present invention relates to methods for making molded plastic vertical-axis tanks that are useful for storing water and other liquids and methods for making same.

BACKGROUND

It is common to store water in unpressurized vessels from which water from time to time is drawn by means of pump or gravity flow, particularly where the water supply is intermittent, or where the instantaneous demand exceeds the flow rate of the source of supply. It is particularly desirable, to have a vessel which is sealed against egress or ingress of liquids when potable water is being stored.

Typical water storage tanks that are associated with dwellings and other smaller buildings will have 500 to 1000 liter capacity. A squat cylindrical shape tank is popular for reason of compactness and manufacturability. A representative 500 liter tank might be about 100 cm in diameter and 100 cm high. One approach is to make a one piece tank, such as by blow molding or rotational molding. However, if a whole tank ready for use is shipped, the shipping cost can be an unacceptably high fraction of the total cost of making and delivering the product.

Thus, one marketplace solution has been to have manufacturing sites dispersed around the country, when it is geographically large as is the U.S. However, for lower volume products with high machinery or tooling costs, the net result of long distance shipping or duplication of manufacturing facilities can be that the price of the product to the consumer is higher than it might be if the product could be made so that it could be shipped in more compact form.

One solution has been to form a tank from mating identical half tanks which can be nested for shipment and assembled in proximity to the point of use. See U.S. Pat. No. 5,878,907 of Graf. The tank has a mid-elevation joint which is secured by means of clamps or welding. Another approach used in commerce is to make the tank in the form of a bucket like base which is combined with an associated lid. The bases have sufficient draft to enable nesting for shipment. The present invention is concerned with such types of tanks. Further improvements in design and manufacturing are needed for such kinds of tanks, to reduce manufacturing costs while providing a tank which is good for potable water, which has a joint near the top of the tank that is secure and not overly sensitive to small lid-to-base joint imperfections. The tank also should be suited for quick and easy assembly.

When water storage tanks are used for potable water there can be other needs to be satisfied. Depending on the user and specific application, it may be desirable that the exterior of the tank be colored and not show dirt and grime as will a white tank, that the tank wall will be opaque to inhibit passage of sunlight, that the plastic materials of construction be appropriate for preserving the purity of the water, and that a user may be able to tell, by looking into the tank, what is the cleanliness condition of the tank and water.

SUMMARY

An object of the invention is to provide a plastic water storage tank which can be economically manufactured, shipped and stored. Another object is to provide a two piece water storage tank comprised of components which can be nested for shipment or storage and which have good joint seals when assembled. A further object is to provide a water storage tank made of a lower cost plastic substrate having a thin interior liner made of higher grade material that provides the interior water-contacting surface of the tank or that enables a user to check visibly the clarity of the water.

In accord with the invention, a plastic water storage tank comprises a tank base which has a tub like interior concavity, and optionally in combination with a cover that is attached to the base. Each base or cover part is nestable within a like part, so the parts can be shipped and stored compactly in kit form.

In accord with the invention, a tank comprises a base to which is attached a cover or lid by means of alternative joints, including (a) a joint comprised of elastically engageable circumscribing rims; (b) a joint held together by clips; (c) a joint in which serrations on a skirt of the cover engage mating serrations on a cylindrical portion of the base and (d) a joint wherein tabs on the rim of the cover part engage lip segments of a flange of the rim of the base, when the parts are mated and rotated relative to each other. A particular flange of the type (d) is configured with openings that enable manufacturing by means of injection molds that do not require slides.

In further accord with the invention, embodiments of a tank base have a composite wall comprised of two layers. The inner layer, which presents as the surface of the concavity of the base is referred to as the liner. The other layer is referred to as the substrate and it is the structural component of the base. In the methods of the invention the liner is integrally adhered to the substrate layer during the manufacturing process. In preferred embodiments of the invention the substrate is a recycled thermoplastic and the liner is a much thinner layer of virgin plastic.

In one method of making such tank bases, the liner is provided as a bag-like structure or sleeve which is put around the core of a plastic injection mold, which core defines the interior concavity of the base, prior to positioning of the core within the mold cavity. Plastic is injected into the mold to adhere to the bag or sleeve where it is positioned on the core. A method of so-using a sleeve is two-step. In the first step the plastic injected around the sleeve within the mold to form the substrate of the base; then the core is retracted a bit from the mold to expose the bottom of the substrate where there is no sleeve material, and a further injection of plastic is used to form the liner which surfaces part or all of the bottom of the concavity of the base.

The foregoing and other features of the invention and their advantages will be more fully appreciated from the drawings and description which follows.

BRIEF DESCRIPTION OF THE DRAWINGS

FIG. 11 is a partial view of the upper end of a tank base showing a particular rim configuration.

FIG. 11A is a vertical cross section through the rim of a tank base shown in FIG. 11 along with parts of the core and cavity mold that are associated with injection molding of the tank base.

FIG. 12 is a vertical cross section through the side of a tank base showing how a bag made of film is inserted and expanded outwardly to form a base having a two layer wall.

DESCRIPTION

In the present invention a water tank is injection molded, preferably made of polypropylene or polyethylene or other thermoplastic material. In an embodiment of the invention, there is a lower bucket-like part called the base, and an optional cover or lid which attaches to the base by means of a joint. The lid may be flat, dished, or as in the preferred embodiment which is described below, it may be generally conical. The lid may have a top portion which is adapted to receive a water pipe or it may have a spout with a cap. Articles which may be made within the present invention are described first; then a method of making articles is described.

Figure 1:
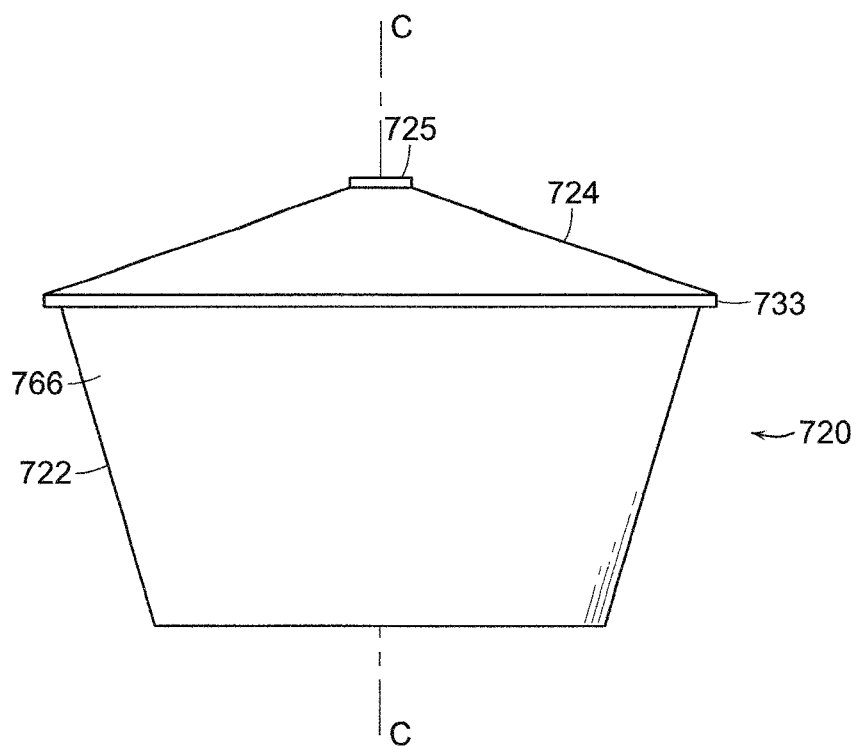
FIG. 1 is a side elevation view of a cylindrical water tank having a conical base and a detachable conical cover.

FIG. 1 is a side view of an exemplary molded tank 720 which has a truncated cone shape base 722 and cover 724 which is mated to the base by cover rim 733. A circular boss 725 at the cover provides a region where a port may be cut to enable passage of a pipe through the cover. Tank 720 is representative of the kind of tank which may be made within the present invention. In the prior art, five hundred liter capacity commercial tanks having shapes like that of tank 720 may be made by rotational molding of thermoplastic. In the present invention, injection molding is used to obtain more precision of wall thickness and rim definition. For simplicity of illustration, certain exemplary tanks which are pictured in here have near-vertical walls. The features of such simple exemplary tanks may be embodied in tanks with more sloped conical walls, for example like those of tank 720.

Figure 1A:
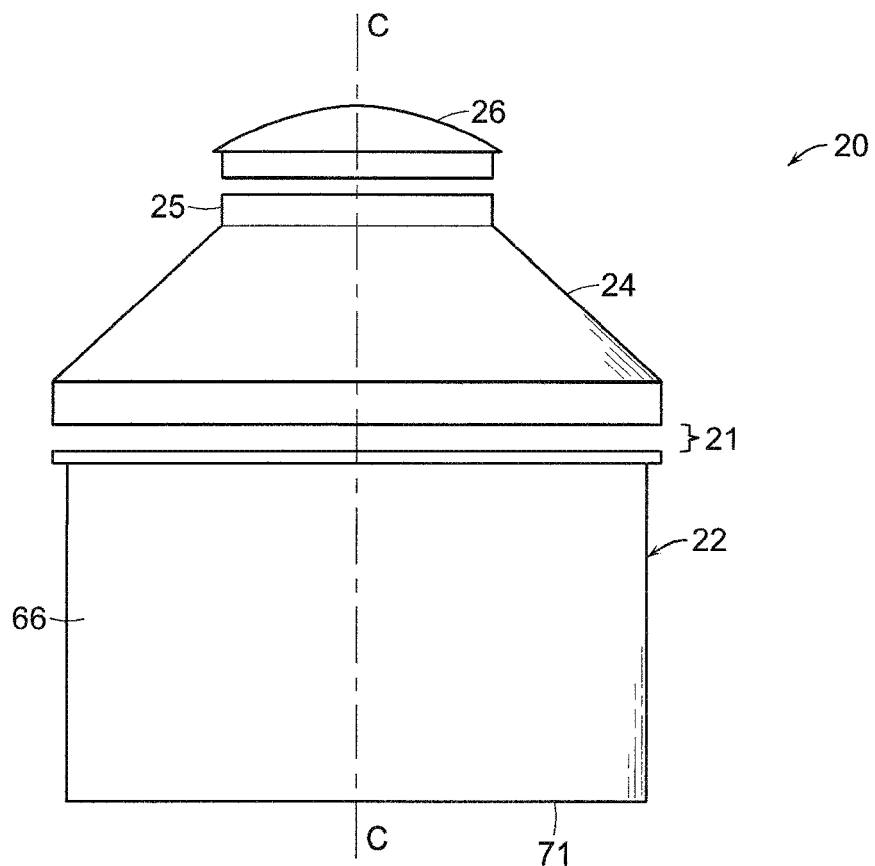
FIG. 1A is a side elevation exploded view of a cylindrical water tank having a conical cover, spout and cap.

FIG. 1A is a side view of molded tank 20 which is comprised of nearly cylindrical base 22 and conical cover or lid 24. The parts share a common central axis C-C, along which they are aligned. Cap 26 closes the spout 25 of the conical lid 24. The joint 21 between the lid is only schematically shown in FIG. 1A; alternative optional joint configurations are described below. During use, the preponderance of the liquid which is stored in the tank is below the elevation of the joint, thus lessening the hydrostatic pressure which the joint has to resist.

Tank base 22, which as the following description indicates is preferably made by injection molding, has a circumscribing side wall 66 and a circular bottom wall 71. The sidewall 66 of tank base 22 has a draft, typically at least 1-3 degrees, as characterizes typical injection molded products, to enable easy removal from an injection mold. In practice, the draft angle is preferably chosen to be sufficiently large, for instance 6 degrees or more slope per side or more, to enable nesting of bases for shipment or storage. Wall 66 may have a thickness of about 3 to 4 mm. Lid 24 has a wall thickness which is similar to that of the base; the lids are also nestable. The lid and the walls of the base of a tank may be corrugated for strength; alternately the lid and walls may have ribbing, according to what may be accomplished within the limitations of the manufacturing technique.

FIGS. 3-7 show different means for sealing a joint and means for holding the cover and base together. It will be apparent that the seals and joint locking means may be used in different combinations than the particular embodiments which are pictured.

Figure 3:
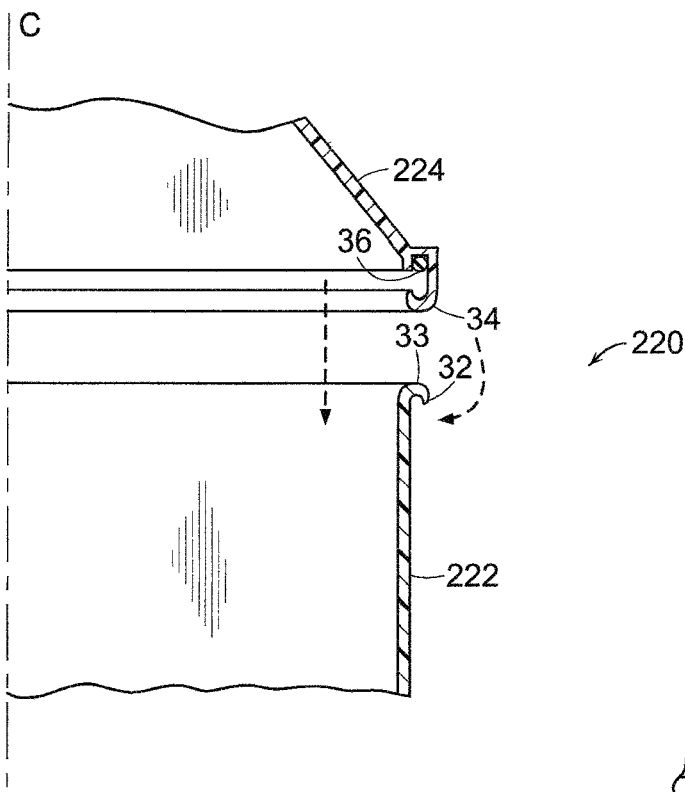
FIG. 3 is a fragmentary vertical cross section through the cover and base of a tank like that shown in FIG. 1A, illustrating a particular engagement and sealing means between the parts.

FIG. 3 is a partial vertical cross section of tank 220 which has a cover 224 that aligns along tank vertical axis C-C and mates with base 222 as indicated by the arrow. Cover 224 has a circumscribing skirt 34 with an inward facing lip so that in cross section the skirt has a hook-like terminal end. O-ring seal 36 is captured in a groove within the recess within skirt 34. Base 222 has a rim 32 that comprises an outward facing extending lip, which in cross section provides a hook like terminal end. When the parts 224, 222 are mated as indicated by the arrow, skirt 34 of the top edge springs elastically outwardly due to interference-engagement with rim 32 of the base; and, then the skirt 34 springs back inwardly due to the elastic resilience of the cover material; whereupon the hook ends 32, 34 are engaged with each other. The dimensions of the skirt 34 and lip of rim 32 are such that when they are engaged, the vertical spacing between the upper surface of the top edge of the base and the base of the groove which circumscribes the edge of the cover is such that the O-ring contained in the groove is compressed by the top edge 33 of rim 32, thereby accomplishing sealing of the joint. Skirt 34 may have circumferentially spaced part vertical slits to ease its radially outward expansion during the engagement process.

Figure 4A:
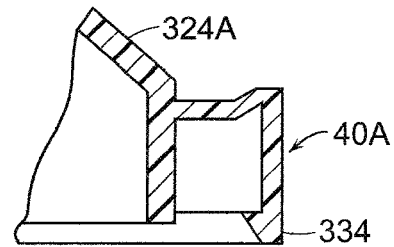
FIG. 4A is a cross section detail showing a modification of the rim of the cover of the tank of FIG. 4.
Figure 4:
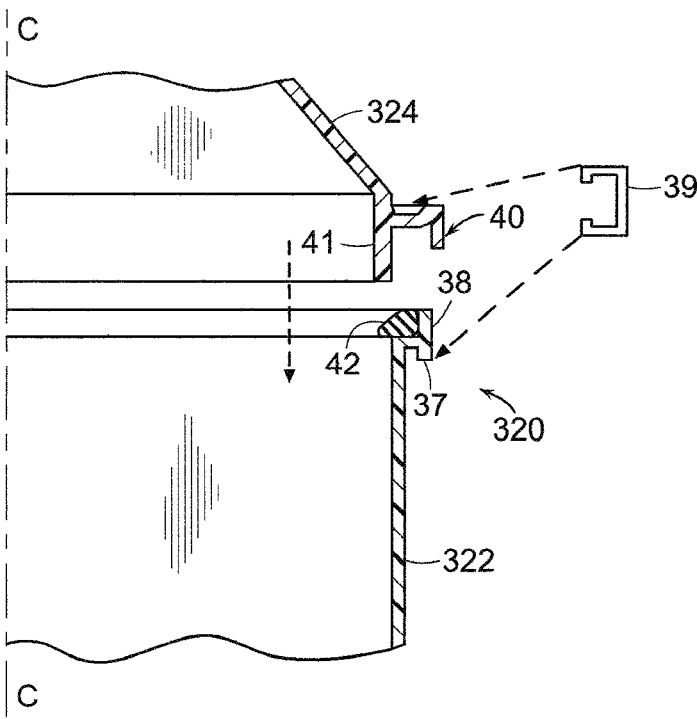
FIG. 4 is a view like FIG. 3 showing a different means for engagement and sealing.

FIG. 4 is a half cross section view of part of tank embodiment 320, showing how cover 324 mates with base 322. The rim 38 of the base comprises a shelf upon which rests wedge shape elastomer gasket 42. As the rim 40 of the cover is engaged with rim 38 of the base, skirt 41 pushes the narrow edge of gasket 42 radially outward and downward. Thereafter, the resilient force of the seal against the skirt 41 both forms a seal at the joint and frictionally retains the cover in place. A multiplicity of C shape clips 39, made from such as high strength plastic or spring steel, hold the cover in place. The clips clamp rim 40 of the cover to rim 38 of the base by engaging respectively a groove and a lip thereon, as indicated by the dashed arrow lines in FIG. 4. FIG. 4A shows the outer portion a modified cover 324A for which a clip 39 is not used. The outer skirt of rim 40A has a barb or hook-like cross section terminal end 334, which terminal end resiliently engages the lip 37 on the underside of the rim 38 of base 322. With respect to the description which follows next, the terminal end 334 can be considered to comprise a circumscribing ridge.

Figure 5:
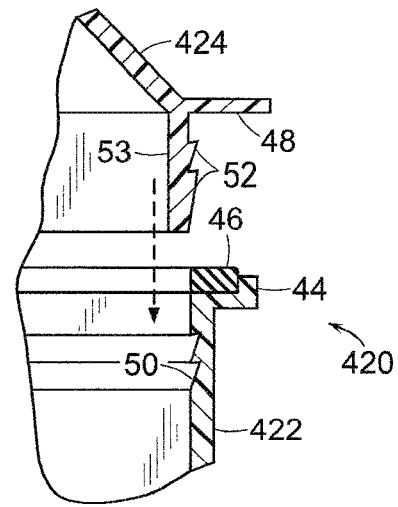
FIG. 5 is a view like FIG. 3, showing another means for engagement and sealing.

FIG. 5 is a fragmentary view like FIG. 3 and FIG. 4, showing the outermost portion of a tank 420 which is comprised of base 422 and mating cover 424, as indicated by the arrow. The interior of the sidewall of the base has a serrated surface comprised of two circumferential Vee shape grooves 50. The uppermost edge of each Vee groove is nominally horizontal. Optionally there may be fewer or more grooves. The outer surface of skirt 53 of cover 424 is serrated in that it has circumscribing ridges 52. The two ridges 52 are shaped for mating engagement with the grooves 50. When the cover and base are pushed together, the wall of the base is deflected outwardly a bit and the skirt 53 of the cover is deflected inwardly a bit. The ridges and grooves likewise elastically deform. When the skirt sufficiently enters the bore of the upper end of the base, ridges 52 snap into grooves 50. A resilient seal 46 circumscribing the upper end 44 of the base is compressed by contact with the underside of laterally extending flange 48 of the cover, to make a tight joint. Alternatively, the seal may be positioned within a groove (not shown) which may be formed in the underside surface of flange 48 of the cover, and the upper end 44 of the base will then be shaped appropriately for sealing engagement.

Figure 6:
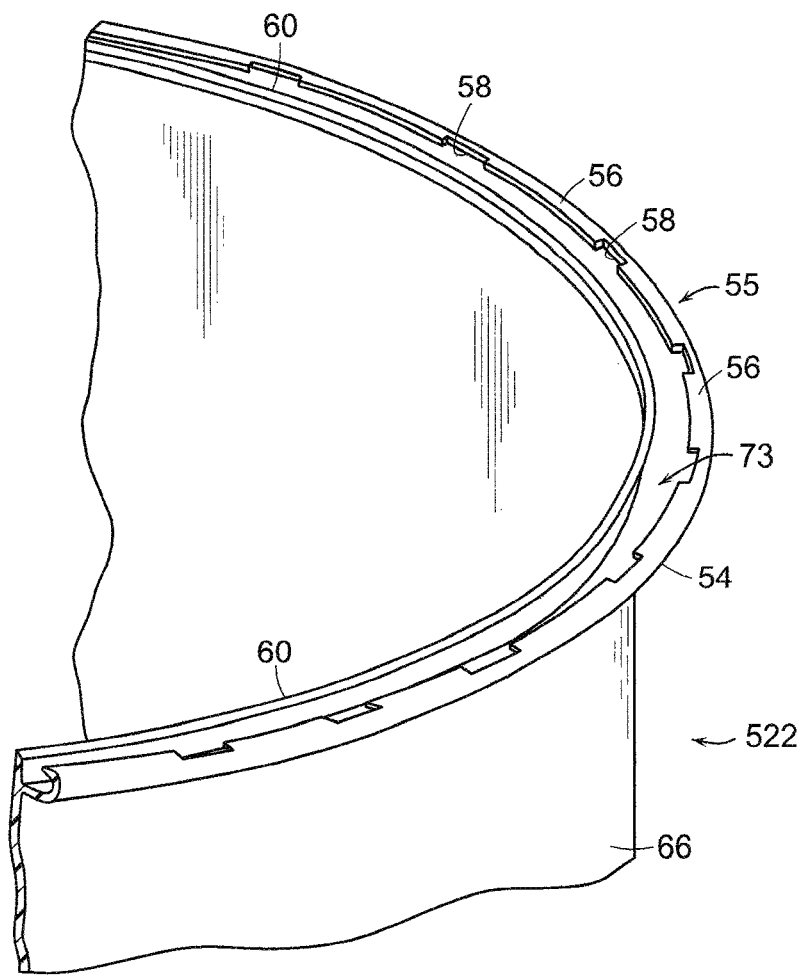
FIG. 6 shows a portion of the upper end of a tank base.
Figure 7:
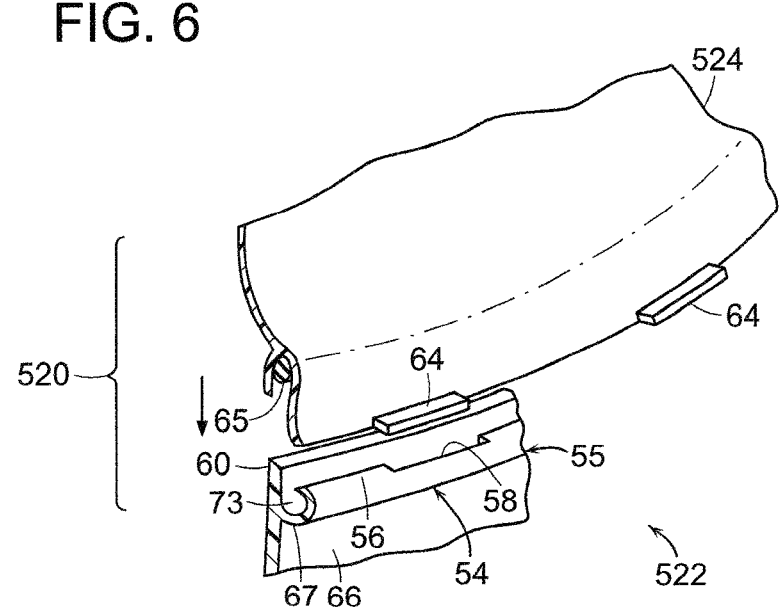
FIG. 7 shows a fragment of the tank base of FIG. 6 in combination with a cover, in exploded view.
Figure 8:
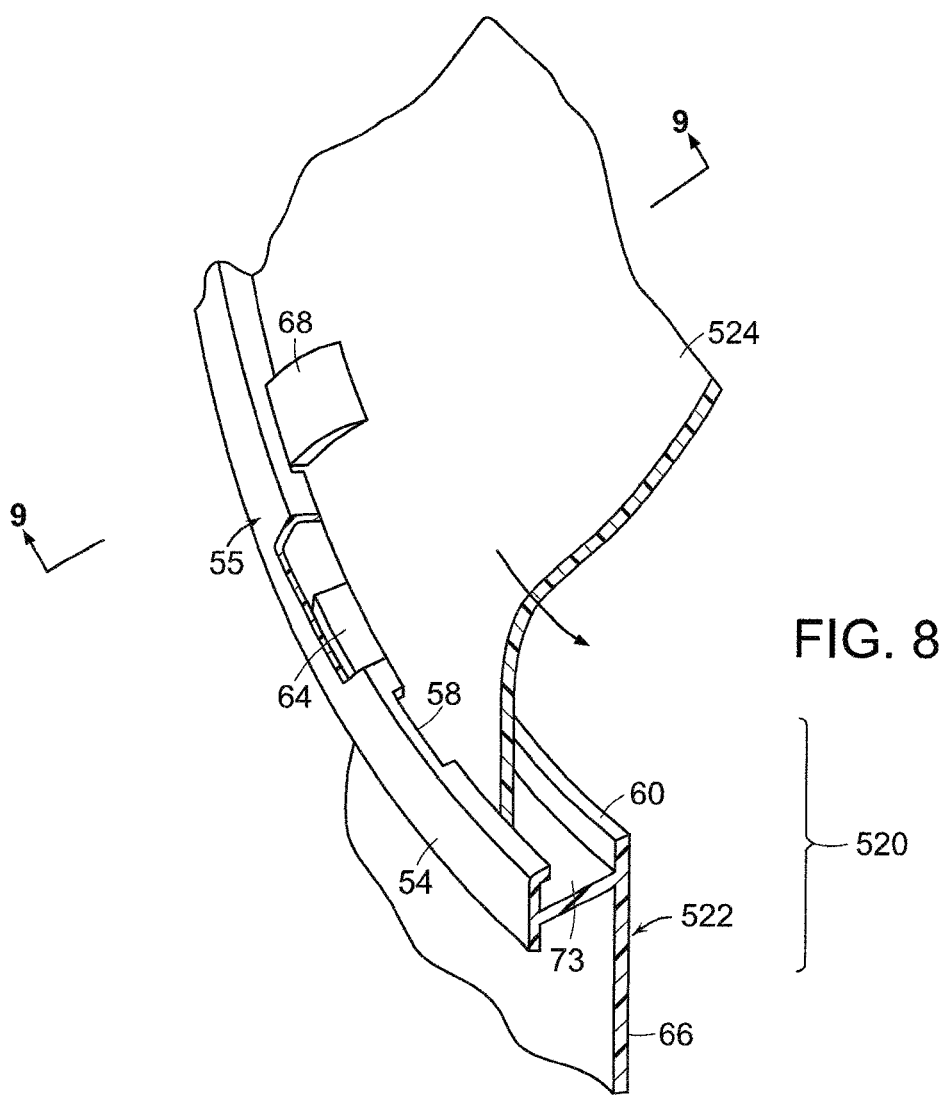
FIG. 8 shows is a fragmentary perspective view showing the cover and base of the tank of FIG. 7 when they are engaged to form a joint.

FIG. 6-8 are related. FIG. 6 shows a portion of tank base 522 and FIG. 7 shows a portion of cover 524 which engages the base to form a tank 520. During engagement to form a joint with the base, cover 524 is rotated through a slight arc relative to the base, to reach a final position where the tabs of the lid underlie inward extending lip segments of the rim flange of the base. See FIG. 8. Cover 524 is shown in the form of simple lid for simplicity of illustration; it may alternately have a conical shape like covers 24, 724.

With reference to FIG. 6, base 522 comprises sidewall 66 which terminates at upper edge 60. Rim 55 comprises the upper end of sidewall 66 and flange 54. Flange 54 has a first portion 67 which extends radially outwardly from the wall 66. Flange 54 curves upwardly from portion 67 and then runs radially inwardly in the form of lip segments 56 which are spaced apart by cutouts 58. The lip segments extend inwardly over cavity 73 which is defined by the flange 54. See FIGS. 6 and 7.

The cover 524, which is shown in FIG. 7 as it is being lowered onto the base 522 (see the arrow), has outwardly extending tabs 64 which are shaped to fit into cutouts 58 of the rim of the base. Preferably, tabs 64 have an upper surface which is sloped in the circumferential direction, upwardly from the plane of the circle of the rim of the cover. As indicated by the arrows in FIG. 7 and FIG. 8, the cover is mated with the base so the tabs first pass through cutouts 58; the cover is then rotated relative to the base so the tabs 64 move underneath the inward extending lip segments 56 of the rim 55. Because of the engagement of the sloped upper surfaces of the tabs 64 with the lip segments 56, the cover is forced closer to the base upon rotation.

Figure 9:
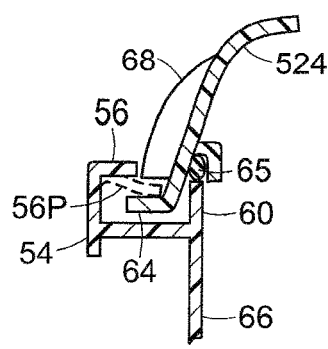
FIG. 9 is a vertical cross section of through the joint shown in FIG. 8.

With reference to the perspective view of FIG. 7 and the cross section view of FIG. 9, during the foregoing engagement seal 65 which is contained within a groove in the cover is simultaneously compressed by contact with upper edge 60 of the sidewall of the base—as the cover thrusts downwardly with increasing rotating engagement of the cover with the base. In an alternative embodiment, the tabs 64 have flat top surfaces and the undersides of the lip segments 56 are sloped, to achieve comparable vertical compression of the seal. In still another embodiment, the tabs and undersides of lip segments 56 are flat and there is no downward-thrusting wedging action.

In one embodiment of tank 520 the cover and base of the tank 520 will stay engaged due to friction between the parts of the cover and base at the joint location. In another embodiment, exemplified by the parts shown in FIG. 8 and the cross section of FIG. 9, cover 524 optionally has a molded-in key 68 which projects radially outwardly from the exterior surface of the cover. There may be more than one key. Exemplary key 68 is circumferentially located relative to the tabs 64 of the cover, so that when the cover is mated with the base so make the tabs slip into cutouts 58, the bottom side of the key presses downwardly on a lip segment 56 of the rim 55. FIG. 9 shows how key 68 presses down on the lip 56, deflecting it as shown by phantom 56P in FIG. 9. When the cover is then sufficiently rotated, key 68 comes to one of the cutouts and the lip 56 springs upwardly, to thereby limit further rotational motion and potential loosening of the cover.

Figure 10:
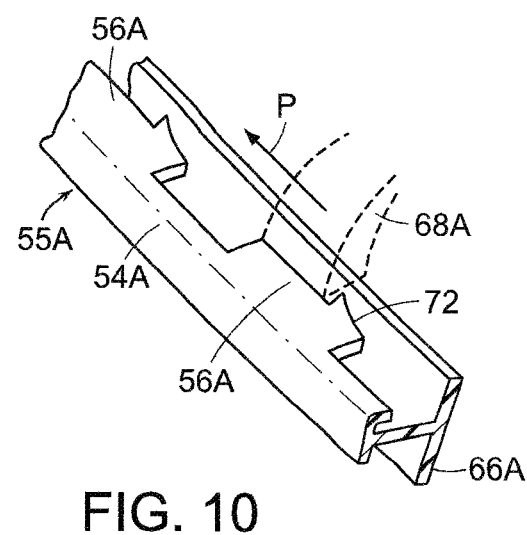
FIG. 10 is a partial view like FIG. 8, showing only the upper end of the base with a phantom view of a key which may be an integral part of a cover which locks.

In another embodiment of tank 520 which comprises a lock on the lid, illustrated by FIG. 10, the inward edge of one or more of lip segments 56A of the base rim 55A has a laterally extending wedge portion 72 that causes a lip segments 56A to be elastically deflected radially outwardly when the cover and integral molded key 68A (shown in phantom) is rotated as indicated by arrow P. The web shape portions 72 prevent rotation of the cover, in the loosening direction which is opposite to the direction of the arrow P in FIG. 10. The wedges on the inner edges of the lip segments which are shown in FIG. 10 may be used in combination with a cover having tabs 64 that are shown in FIG. 7.

Such a resultant cover and base combination would comprise a cover which would not be susceptible to easy removal, which may sometimes be desirable.

It should be appreciated that various of the foregoing joint configurations comprise a structural connection between the parts, and the cover thus provides desirable increased hoop strength to the tank at the joint location. When that is achieved, the wall of a tank part might be made thinner than would otherwise be feasible.

In general when manufacturing injection molded tanks it is desirable to avoid the use of mold portions which have slides (internal moveable parts). Artisans may consider that making several of the covers and bases according to the particulars of the pictured embodiments here may require molds having slides. In particular the rim 55 and its inward extending lip segments 56 may be thought to require such. Whatever, FIG. 11 and FIG. 11A illustrate how a base having a rim with features of the foregoing embodiments can be made without the use of mold slides.

FIG. 11 is a partial downward perspective view of the upper portion of the base 622 which is like the base 522 shown in FIG. 6, but for the details which are now described.

Rim 55 is configured in a way that enables injection molding of the base while using a straight-pull core and cavity mold combination; in particular rim 55 has a plurality of spaced apart holes 57 which underlie the inward extending flange portions 56B.

FIG. 11A is a vertical cross section through the rim portion of base 622. The Figure also shows a portion of the cavity mold 59 and (in phantom) a portion of the core mold 63 which during opening and closing of the mold move relative to each along line 65. The arrows indicate the positions to which the mold parts 59, 63 move during the plastic injection phase of molding. Referring to both FIG. 11 and FIG. 11A, tank base 622 has a wall 66 which terminates at upper end 60. A plurality of spaced apart inwardly-extending flange lip segments 56B are shaped to engage the tabs of a tank cover, like the tabs 64 shown in FIG. 7. The lip segments 56B are formed between the top of pedestal 61 of mold cavity part 59 and the underside of mating mold core part 63. During molding, the top of the pedestal 61 defines the underside of a lip segment 56B. At the same time a plurality of spaced part holes 57 are (necessarily) created. A benefit of the holes 57 is to allow dirt and water which enters the cavity 73 flange to escape. Cutouts 58B, which enable tabs 64 of a cover to be vertically slipped downwardly before the cover is rotated, are formed by the mold core part 63.

One of the features of tanks in accord with the present invention is that, if it is necessary to clean the tank, (ignoring that the user has to defeat any lock) the cover can be removed from the base to provide much better access than can be obtained through a port on the cover of the tank. The unique rim and seal configurations which are disclosed above may be used in combination with cover and base tank portions which have flanges that are screwed or bolted to one another.

The cover and base of a tank may be made of a single composition material. Alternatively, for economic reasons, it may be desirable to fabricate a tank predominately of a structural plastic material which might be less pure than virgin plastic material, and to combine that with a liner made of superior quality material which contacts the water. The aim is to guard against the possibility that potable water in the tank could be influenced by leaching of something from the less than virgin pure material of the substrate of the tank. In another respect, it may be desirable to have a tank with a dark color exterior and a light color interior, so the cleanliness of the interior can be better visually inspected and so the exterior shows fewer scratches and dirt. The following describes how tanks having a two-layer wall, also called a composite wall, may be formed. The invention is described in terms of a single mold cavity and associated core; it will be understood that a mold for a production machine may comprise a plurality of such mold cavities and core parts.

Figure 2:
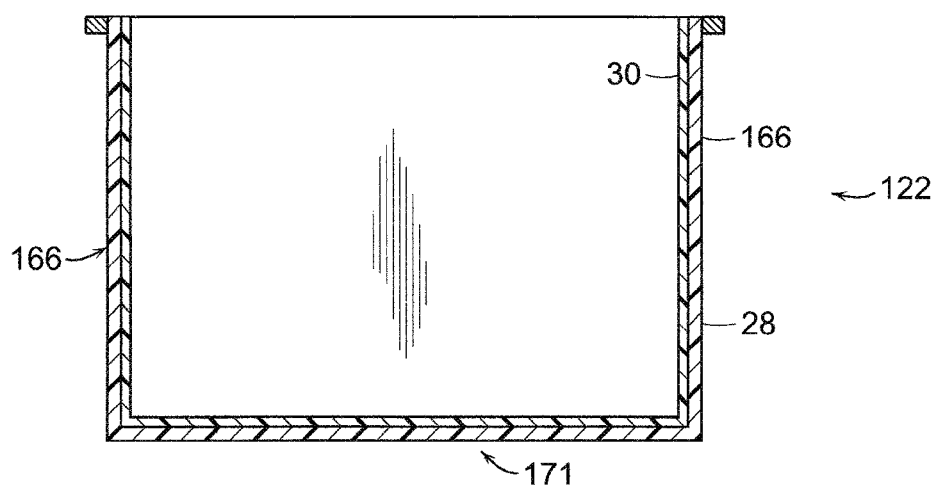
FIG. 2 is a vertical cross section through the base portion of the tank of FIG. 1A, showing a composite wall.

FIG. 2 is a vertical cross section through the base 122 of a tank like tank 20 shown in FIG. 1. The tank embodiment has a circumscribing side wall 166 and a bottom wall 171. The preferred walls comprise first portion or layer 28 and a second portion or layer 30. The inner layer 30, which presents on the surface of the concavity of a base, is often referred to here as the liner. The outer layer is often referred to here as the substrate. It will be understood that the term first layer may be used interchangeably with substrate, both referring to the same thing.

The substrate is typically much thicker than the liner. For purposes of illustration the tank is shown in simplified form, the thicknesses of the wall elements are exaggerated, and any familiar but optional substantial angling of the walls is not portrayed. In an exemplary tank, a liner 30 may have a thickness of about 0.01 to about 0.4 mm and the total wall thickness may be about 1.5 to about 3.2 mm. In an exemplary tank, the material of the base substrate may be a recycled polypropylene or polyethylene and the lining 30 may be virgin polypropylene, another polyolefin, or another thermoplastic.

The base 122 of a tank comprising a liner 30 may be constructed using alternative manufacturing techniques. In one approach, an essential tank base 28 (i.e., a base having a single layer and no liner; the same as a substrate) is molded and removed from the mold. The interior of part 28 is then coated by spraying or deposition, to create on the interior a surface layer or liner having desired chemical properties, e.g., suitable for contact with potable water. For example, a urethane plastic coating or a plastic-adherent paint may be applied.

In an alternative approach, as illustrated by FIG. 12 which is a vertical cross section through an essential tank base 28A, a bag 30A made of film may be inserted and expanded outwardly to form a two layer wall tank part. Bag 30A has a shape which is slightly smaller than the interior cavity of part 28A; the bag is placed within the cavity of part 28A and is radially expanded, as by gas pressure, preferably while being heated, so that it conforms to and becomes attached to essential base part 28A, thus becoming lining 30 as shown in FIG. 2. Attachment of the lining 30A to the interior of base part 28A may be achieved by means of an adhesive applied to the interior cavity surface of part 28A, or by other treatment of the mating surfaces.

Figure 13A:
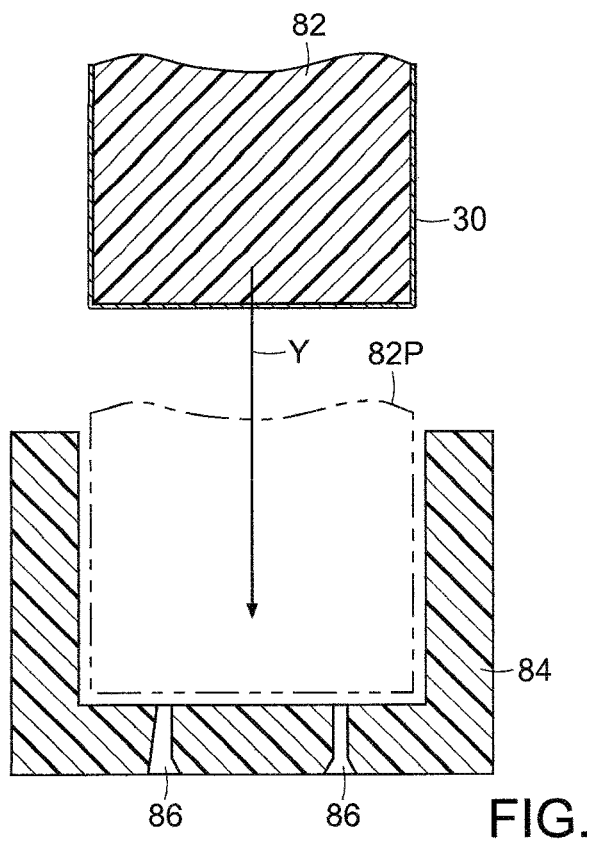
FIG. 13A is a vertical cross section through portions of a core and a cavity of an injection mold showing how a liner may be placed around the core before injection molding.

In another approach, a plastic film may be placed over the core of an injection mold which during molding defines the interior of the tank base part. FIG. 13A is a vertical cross section of a largely schematic plastic injection mold comprising a cavity 84 and core 82. As shown, liner 30 is placed on the core before the core is moved into the cavity 84 part of the mold. The arrow Y shows how the core bearing the liner on its exterior moves into a position (indicated by the phantom 82P of the core) within the cavity 84 for injection molding. In the molding step, plastic is injected through ports 86 to form the wall and bottom of the base. The plastic flows around the core and becomes adhered to the plastic film 30 carried upon the core. Thus a base 122 like that shown in FIG. 2 is created.

Figure 13B:
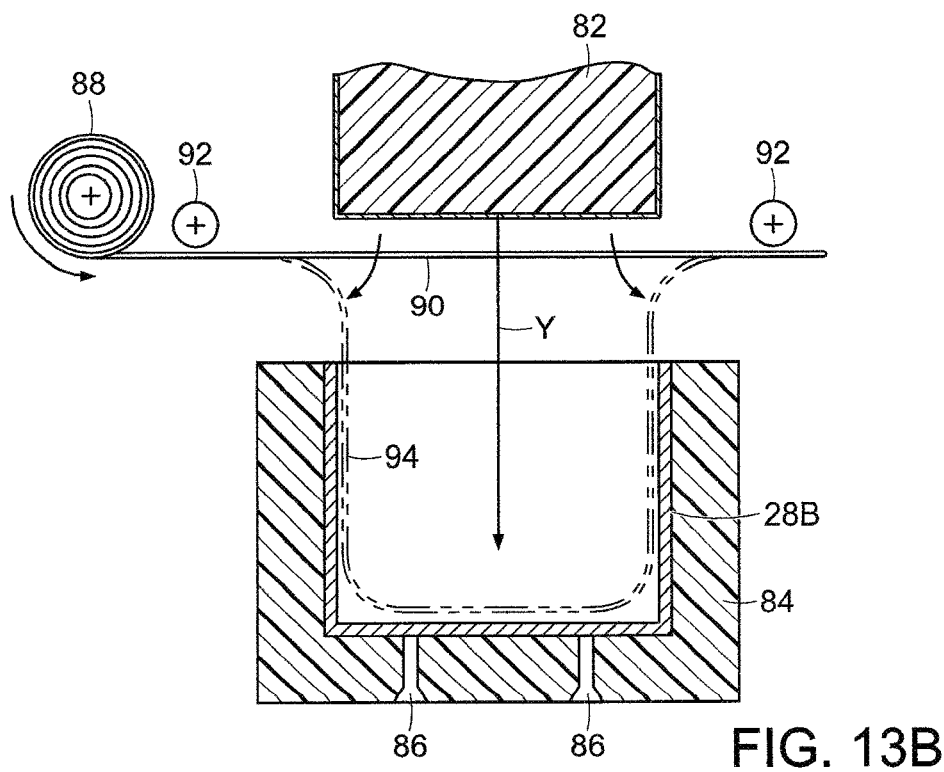
FIG. 13B is a view like FIG. 13B illustrating how a film sheet may be engaged by a downward moving core and pushed into the cavity of the mold, to form a liner of a tank base.

FIG. 13B shows a similar approach to making a base, one in which the liner is not preplaced as a bucket-shape preform on the core, but is provided as a plain sheet. FIG. 13B is a vertical cross section of a mold assembly like that of FIG. 13A and is very simplified from the complexity of a real apparatus. A sheet 90 of film is drawn from roll 88 and runs between rollers 92, so that it lies in the path of the core 82 as the core closes (indicated by the arrow Y). As the mold is closed, a portion of film 94 is created with a deformed shape caused by wrapping around the core, as indicated by the arrow pair, and the film portion 94 is pushed into the recess of the mold cavity part 84. The film portion 94 may be clipped from the rest of the sheet 90 of film. Then plastic is injected through ports 86 to form substrate 28B shown in phantom; and in doing that the plastic flows around the core and becomes adhered to the plastic film carried by the core. Thus the film portion 94 becomes a layer 30 as shown in FIG. 2 when the tank base is removed from the mold. Depending on the nature of the film 90, it is likely that the film which is carried by the core will be wrinkled, particularly at the center of the apex of the core. To address that, the chosen film may be a heat-shrinkable (irradiated) plastic film, and a high heat transfer rate heater may be used to shrink the film after it is gathered on the core, but before the core is inserted into the cavity, given suitable spacing of the core from the cavity and suitable heating means.

Figure 14:
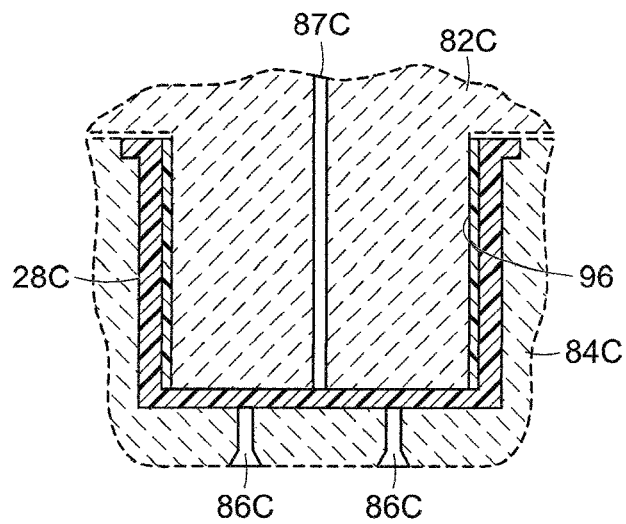
FIG. 14 is a vertical cross section through a schematic mold to illustrate how a two layer base is formed, showing a core carrying a film sleeve, positioned within a cavity containing a molded base.
Figure 15:
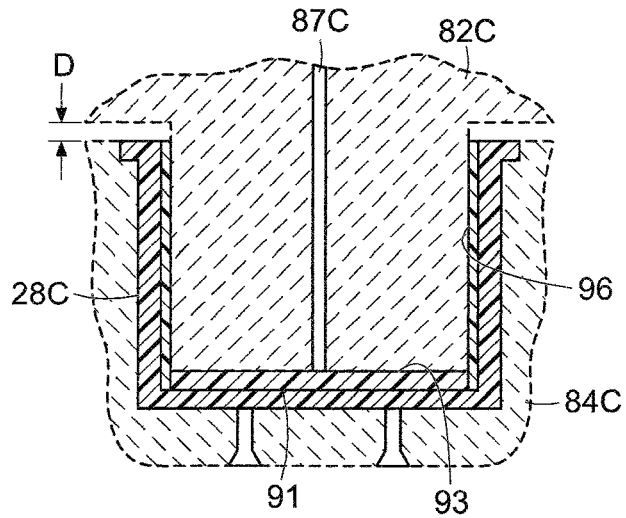
FIG. 15 is a view of the apparatus in FIG. 14 after the core of the mold has been retracted and further plastic has been injected to form the bottom of the liner of the base.

Two other techniques which involve two-step formation of the liner may be used, to lessen any potential film wrinkling issue. A first two step process is illustrated by means of FIG. 14-15 which are cross sections through an essential base 28C. FIG. 14 shows the base as it has been formed by injection molding in a mold comprised of core 82C and cavity 84C, shown in phantom. In a first step, a substantially cylindrical sleeve 96 of plastic film is first put around the core 82C, the core is then positioned within the cavity and plastic is injected into the mold through ports 86C to form the essential base 28C which is thereby adhered to the sleeve, as illustrated in FIG. 14. Thus, the sleeve forms the circumferential wall portion of a liner 30. In the second step of the process, as illustrated by FIG. 15, the core 82C is retracted a small distance D from the cavity to create a space between the bottom of the core and the upper surface of the bottom wall of essential base 28C. Then plastic having desired liner characteristics is injected through port 87C into the space to form the portion 93 of the liner. The portion 93 covers and adheres to the upper surface of the bottom of the essential base 28C. When core 82C is retracted a distance D in step 2, as above, it is withdrawn relative to sleeve 96, thereby exposing the bottom end of the sleeve, which bounds the lateral periphery of said space. Thus, when plastic that forms portion 93 is injected, it flows against and adheres to the bottom end of the sleeve; and thus a tank base having a liner 30 like that shown in FIG. 2 results.

Figure 16:
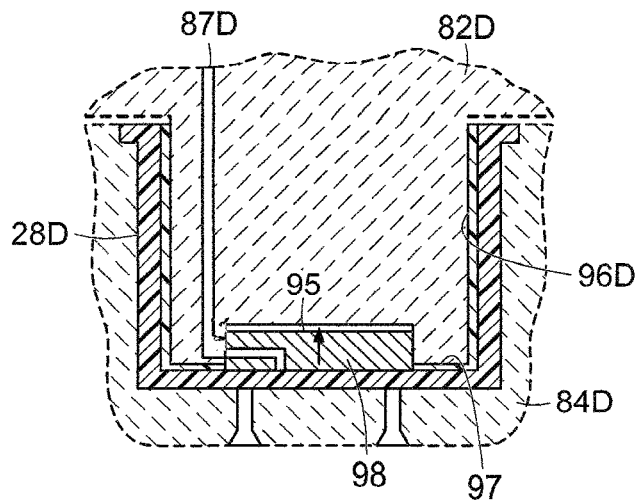
FIG. 16 is a vertical cross section of a schematic injection mold showing a core which has a moveable insert, for use in making a base with a liner in a two-step procedure.

FIG. 16 is like FIG. 14. It illustrates another approach for forming a base comprising a liner. In the method associated with FIG. 16, sleeve 96D is carried by the core 82D in a way similar to way in which sleeve 96 is carried as on the core, as described in connection with FIG. 14. Compared to the simple cylinder of sleeve 96 described above, sleeve 96D is shaped as a cylinder with a partially closed end 97. The end 97 is flat disk with a central hole. Core 82D comprises a moveable insert portion 98. In a first insert position, the bottom surface of the insert aligns with the bottom surface of disk 97 to present a flat surface. In that condition, the essential base 28D is formed by injection of plastic into the mold space defined by the core 82D and cavity 84D; and the foregoing flat surface defines the molded interior surface of the bottom of the essential base 28D. At the same time, disk portion 97 of sleeve 96D thereby becomes integral with the essential base 28D. Next, insert 98 is moved away from the bottom interior surface of the base 28D (upwardly in the picture) and into insert cavity 95 of the core 82D. Then further plastic, having a composition consistent with the composition of liner 96D is injected into the mold through channel 87D, to fill the space between the retracted insert and the interior bottom of the previously formed essential base 28D. The further plastic contacts and adheres to both the central part of the essential base 28D and the inner edge of the disk 97, so that a base with full liner is thereby created. The core is then retracted from the cavity and the base with liner is ejected from the cavity.

Figure 17:
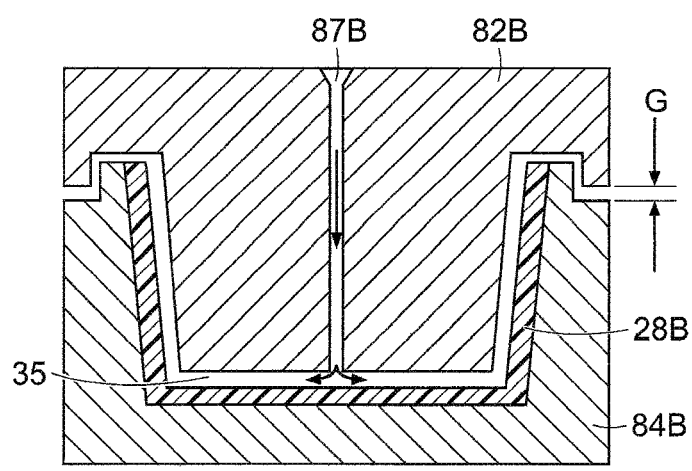
FIG. 17 is a vertical cross section of a schematic injection mold, illustrating how a two-step injection process may be used to form a two-layer tank base.

Still another approach is illustrated by FIG. 17 which is a vertical cross section of a largely schematic plastic injection mold. The mold comprises core 82B and cavity 84B. The essential base (substrate) 28B of a tank is shown after it has been conventionally formed by injection of plastic into the mold. The core 82B is shown after it has been retracted a distance G from the cavity 84B. A second shot of plastic material is next injected through the port 87B in the core, so that the material flows as indicated by the small arrows, to form a second material layer in the space 35. The second material flows against and adheres to the essential substrate and thus becomes a liner 30 that is integral with the base 28B, as illustrated by FIG. 2.

Bases made in accord with the invention may have additional layers. For example, a further layer may be applied to the exterior of the substrate to change the color appearance of the tank base. Covers may be fabricated by the same essential processes used for making bases.

Figure 18:
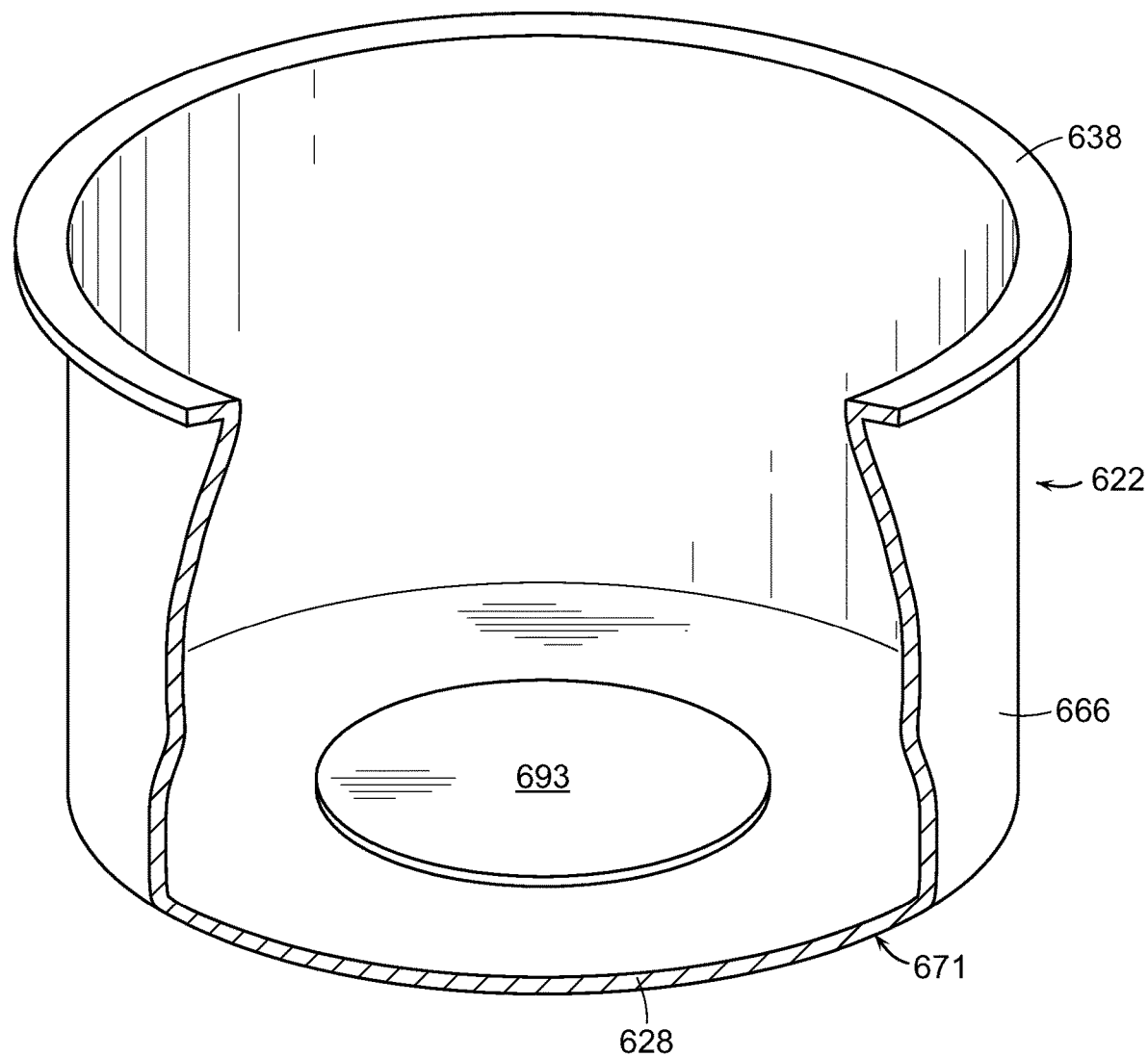
FIG. 18 is a perspective view of a tank base, with a cut-out sidewall, to illustrate a different-material disk on the interior bottom of the tank.

In another embodiment of the invention, illustrated exemplarily in FIG. 18, the interior of a tank has a light shade plastic liner layer in the form of a disk which is adhered to the substrate at the bottom of the tank; and there is no liner layer on the side walls. Tank base 622 comprises a rim 638 for receiving a lid (not shown), a circumscribing sidewall 666, and a circular bottom 671. Liner 693 only covers a part of the interior of the tank base 622, namely, a disk shape region which is preferably smaller than the inside diameter of the bottom as shown in FIG. 18. Optionally, the disk shape region is nominally equal to the diameter of the circular bottom. The disk shape liner portion 693 may be formed by using the previously described process steps, whereby either the whole core is withdrawn a small distance, as described in connection with FIG. 14-15, or whereby only a central portion of the end of the core is withdrawn a small distance, as described in connection with FIG. 16. A preferred tank base may have substrate wall with a thickness of about 1 to 4 mm and a liner disk thickness of about 0.5 to 4 mm.

In this aspect of the invention, both the substrate and liner disk are preferably the same or compatible virgin materials, preferably polypropylene or polyethylene. Preferably, the material of the substrate of the base is a dark color, preferably blue color and the disk shaped liner portion is a light color, preferably white. When the substrate wall is a dark color, it will inhibit transmittal of light, e.g. sunlight; into the interior of the tank to inhibit heating and certain kinds of bacterial growth, and the tank exterior will less readily show soil and small scars than will a tank having a light color or white exterior surface. A benefit of having the light color disk is that a user of the tank can remove the normally-present lid and monitor the clarity of the water and detect the presence of any settled-out solids, such as sand of dirt, at the bottom of the tank, enabling decision on whether any remedial action is needed with respect to the water being stored.

The bottom of the tank made in accord with FIG. 18 and the foregoing description may be concave or undulating (as by circumferential ridges or waves), to urge any settled-out debris to concentrate for better visibility. With the scope of this aspect of the invention, the liner portion on the bottom of the tank may have shape other than a disk; for example, the liner portion may be triangular, square or other polygon; and the liner portion may be present in discontinuous segments. In alternative ways of making this aspect of the invention, a plastic disk or other shape liner portion may be separately formed of sheet and adhered to the bottom of a tank base using adhesive or other attachment means.

The invention, with explicit and implicit variations and advantages, has been described and illustrated with respect to several embodiments. Those embodiments should be considered illustrative and not restrictive. Any use of words of orientation, such as top, base, horizontal, etc., will be appropriately applied to an object which is oriented differently from the embodiments pictured in the accompanying drawings. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A method of making a plastic water storage tank which comprises injection molding a portion of a tank base, with use of a single mold comprised of a core part and a cavity part, the tank base having a side wall and a bottom wall, the interior surfaces of such walls in combination defining a tank concavity, wherein the base of the tank is shaped for nesting within like tank bases and a portion of at least one wall of the base comprises a substrate in combination with a liner made of material which is different from the material of the substrate and wherein the liner forms at least a portion of the interior surface of the concavity, the method characterized by:
    (a) surrounding at least the side wall-defining portion of the mold core with a film of first thermoplastic material;
    (b) inserting the core within the mold cavity to define between the core and cavity a mold space that is suited for injection of thermoplastic, wherein the core is shaped to define the interior surfaces of the side wall and bottom wall of said tank base, and wherein the mold cavity is shaped to define the exterior surfaces of the side wall and bottom wall of the tank base;
    (c) injecting a second thermoplastic into said mold space thereby to form the substrate of the tank base and to cause attachment of said film, as a first portion of said liner, to at least that portion of the substrate that comprises the side wall of the tank base;
    (d) then partially withdrawing the core or an end part of the core from the mold cavity, so that the core or the end part of the core moves away from the portion of substrate which forms the bottom wall of the base, to create an void space between the substrate forming said bottom and the moved portion of the core or core end part;
    (e) injecting a third thermoplastic material into said void space so that the third thermoplastic material attaches to the substrate and to the film which comprises the first portion of the liner, thereby to form a second portion of liner contiguous with the first portion; and,
    (f) withdrawing the mold core entirely from the mold cavity and removing the tank base from the mold cavity.

2. The method of claim 1, wherein during step (a) the film surrounds a portion of the bottom-wall defining portion of the core in addition to said side-wall defining portion, said bottom-wall defining portion of film having a general disk shape with a central hole; wherein the thermoplastic injected in step (e) fills said central hole.

3. The method of claim 2, wherein the portion of the core which is partially withdrawn in step (d) is a disk shape portion at the center of the end of core.

4. The method of claim 1 wherein the second thermoplastic material is a recycled plastic material comprised of polyethylene or polypropylene, the first thermoplastic material is virgin polyethylene or virgin polypropylene material, and the third thermoplastic material is the same kind of virgin polyethylene or virgin polypropylene material as the first thermoplastic material.

5. The method of claim 4 wherein the first thermoplastic is black or blue in color and the film and second thermoplastic material is white or a lighter color than the color of the substrate.

6. A plastic water tank comprising a base fabricated by the method of claim 4.

7. A plastic water tank comprising a base fabricated by the method of claim 1.

8. A method of making a plastic water storage tank which comprises injection molding a portion of a tank base with use of a single mold comprised of a core part and a cavity part, the tank base having a side wall and a bottom wall, the interior surfaces of such walls in combination defining a tank concavity, wherein the base of the tank is shaped for nesting within like tank bases and a portion at least one wall of the base comprises a substrate in combination with a liner made of material which is different from the material of the substrate, and wherein the liner forms at least a portion of an interior surface of the concavity, the method characterized by:
    (a) inserting the core within the mold cavity to define between the core and cavity a mold space that is suited for injection of thermoplastic, wherein the core is shaped to define the interior surfaces of the side wall and bottom wall of said tank base, and the mold cavity is shaped to define the exterior surfaces of the side wall and bottom wall of the tank base;
    (b) injecting a first thermoplastic into said mold space thereby to form the substrate of the tank base;
    (c) then partially withdrawing the core or an end part of the core from the mold cavity, so that the core or core end part moves away from the portion of substrate which forms the bottom wall of the base, to create a void space between the substrate and the moved portion of the core or core end part;
    (d) injecting a second thermoplastic material into said void space so that the second thermoplastic material attaches to the substrate as a liner portion; and,
    (e) withdrawing the mold core from the mold cavity and removing the tank base from the mold cavity.

9. The method of claim 8, wherein the end part of the core which is partially withdrawn in step (c) is a movable disk shape portion centered on the core where it is nearest the bottom wall-defining portion of the mold; and wherein said liner portion which attaches to the substrate is circular in shape.

10. A plastic water tank comprising a base fabricated by the method of claim 9 wherein the tank base has a round cross section, wherein the bottom wall of the tank is circular, and wherein the circular liner portion is smaller in diameter than the diameter of the bottom wall of the tank base.

11. The method of claim 8 wherein the first thermoplastic material is a recycled plastic material comprised of polyethylene or polypropylene, and the second thermoplastic material is made up of virgin polyethylene or virgin polypropylene.

12. The method of claim 11 wherein the first thermoplastic material is black or blue in color and the second thermoplastic material of step (d) is white or a lighter color than the color of the first thermoplastic material.

13. A plastic water tank comprising a base fabricated by the method of claim 12.

14. A plastic water tank comprising a base fabricated by the method of claim 8.

15. The method of claim 8 further comprising carrying out, before step (a), the step of surrounding at least the interior-side-wall-defining portion of the mold core with a film of thermoplastic material.

16. The method of claim 8, wherein the whole of the core which is partially withdrawn in step (c).

* * * * *